Dec. 6, 1966  B. L. INMAN  3,289,996
LUNCH BOX HOLDER
Filed Oct. 12, 1965
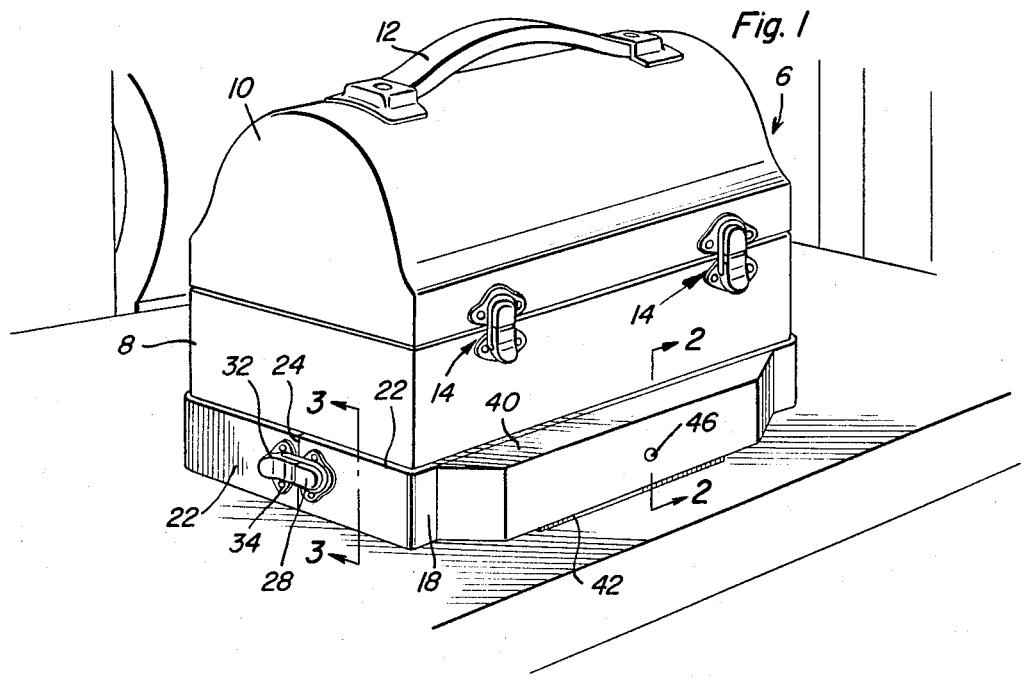
Fig. 1
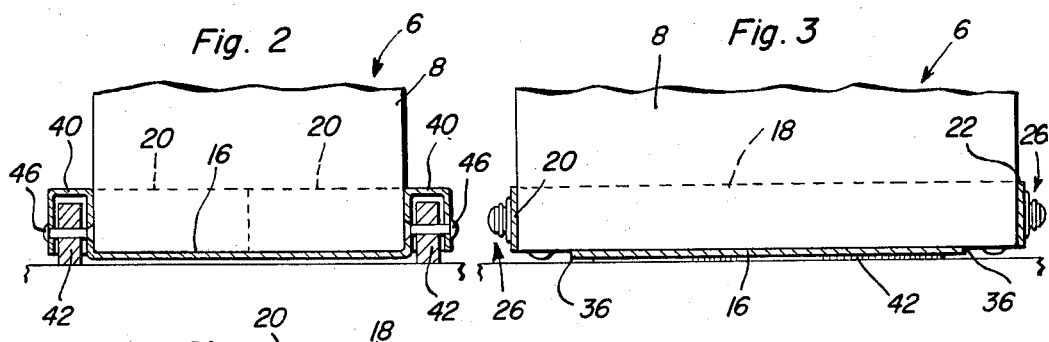
Fig. 2
Fig. 3
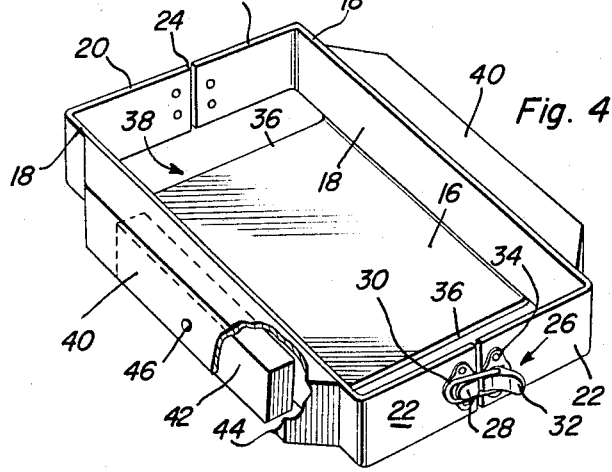
Fig. 4
Bert L. Inman
INVENTOR.
BY *Clarence A. O'Brien*
and *Harvey B. Jacobson*
Attorneys

United States Patent Office 3,289,996
Patented Dec. 6, 1966

3,289,996
LUNCH BOX HOLDER
Bert L. Inman, General Delivery, Pistol River, Oreg.
Filed Oct. 12, 1965, Ser. No. 495,248
6 Claims. (Cl. 248—346)

The present invention relates to a portable lunch box which in and of itself is structurally and functionally like a popularly common handle-equipped hinged lid box and which, as herein disclosed is improved in that it provided with novelly mounted permanent magnets capable of securely but detachably mounting the lunch box on a relatively stationary but movable support.

As should be clear from the preceding general statement of the subject matter of this invention the lunch box itself can be, and preferably is, a well-known rectangular lidded type. Two or more elongated block-like permanent magnets are old by themselves. It follows that the essence of the concept is to employ a common holder, that is a box attachment in which the box is confined and clampingly held and which includes facilities for mounting the magnets so that they can be conveniently caused to adhere to and retain in a given position on powered vehicles and conveyances such as an automobile, pick up trucks and motorized equipment and machinery for use particularly where heavy-duty equipment must traverse rough and unprepared surfaces such as are commonly present at a building and construction site.

A general objective as to provide a simple, practical and economical holder which adapts itself to the aforementioned conventional type lunch box without requiring any alterations in the box and which when the box is fitted in place within the limiting confines thereof assures retention of the box, alternatively, secure attachment to the box and unique and reliable orientation and coordination of the holddown magnets.

The holder is deemed to be an innovation in this line of endeavor in that it comprises, briefly, a shallow elongated tray or receiver for the bottom portion of the lunch box. This tray embodies a bottom wall with an encompassing marginal upstanding rim with the lengthwise components or walls of the rim integral with the bottom, and with the transverse end walls of sectional construction with the ends of the adjacent sections separably connectible by snap locks which when closed clampingly bind the box in the tray.

Then, too, novelty is predicated on the provision on the side walls of elongated open bottom sheaths. The sheaths are not only open at the bottom but serve as a pocket-like enclosure for the coacting permanent magnets, with the bottom edges of the magnet aptly accessible for attachment to and retention on a magnetizable surface of any one of the aforementioned motorized vehicles or conveyances.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a view in perspective of the improved holder, the lunch box clampingly but removably fitted therein and showing at least one of the magnets and how it can be applied to a stock or existing part of a vehicle in readiness for use.

FIG. 2 is a cross-sectional view taken approximately on the plane of the section line 2—2 of FIG. 1 looking in the direction of the arrows.

FIG. 3 is a view at right angles taken on the vertical section line 3—3 of FIG. 1.

FIG. 4 is a view in perspective of the readily attachable and detachable receiver-type holder by itself.

Referring now to the views of the drawing and first to FIG. 1 it will be seen that the numeral 6 designates the aforementioned conventional type lunch box (kit, pail, vacuum bottle holder or the like). Insofar as the present concept is concerned it can be assumed that the expression "conventional or equivalent lunch box" will suffice to identify the conventional part of the over-all combination and which comprises a rectangular openable and closable box or body section 8 and a hingedly mounted cover or lid 10 with carrying handle 12. The lid or cover is shown closed and held in this state by well-known snap locks which are denoted at 14.

The attachment or adapter is of shallow pan-like or tray form. It is made of sheet metal and is rectangular and proportioned to serve as a shallow but reliable holder for the over-all lunch box 6. The generally rectangular bottom is flat and denoted (FIG. 4) by the numeral 16. The upstanding marginal rim comprises a pair of spaced parallel longitudinal wall components 18 provided at their ends with transverse end components or portions, the ones at the left being denoted at 20 (FIG. 4) and the corresponding ones at the right being denoted at 22. It will be noted that the terminal end of these portions are disconnected and provide an intervening space as at 24 which can be either wholly closed or partly closed by way of the tightening and clamping snap fasteners which are denoted at 26. There are snap fasteners at both ends and each embodies a bracket with a fixed detent 28 to accommodate the bail 30 which is carried by the pivoted latch 32 on the bracket 34. There are two brackets and they are mounted on both sides of the opening or space 24 and the latch or bail bridges the space so that it is possible to either loosen or tighten the snap fastener or latching means. It should be noted too that the respective transverse ends 36 of the bottom wall are spaced from the latch connectible ends 20 and 22. This permits the end portions 20 and 22 to yield slightly to obtain an openable and closable clamping action in a seemingly evident manner. Then too, the usual lunch boxes are provided on the bottom wall with embossed projections or supporting feet and spaces 38 serve to accommodate these as shown in FIG. 3.

The tray as thus shown and described provides a satisfactory readily attachable and detachable base and holder for the box. In addition the longitudinal side members are provided on their exterior portions with elongated box-like sheaths or holders 40 for the permanent magnets 42. Each permanent magnet is of rectangular or bar-like form and each holder has top, side and end walls and is open at its bottom as at 44 to expose the lower edge of the magnet for use in the manner shown in FIGS. 1 to 3 inclusive. The median portion of the magnet is fastened by a mounting rivet or pin 46 and it would be within the purview of the invention to rockably mount the median portion of the magnet upon the pin so as to allow slight self-leveling if so necessary or desired. In any event the thus constructed novel tray provides a readily applicable and removable clamp-on type holder for the lunch box 6 and mounting and holding means for the magnets whereby when the lunch box is seated in the receptacle portion of the tray and is tightened and clamped, the box and tray act as a single unit, that is, a unit having holddown magnets which facilitate attaching the over-all unit to a magnetizable surface which may be found available on a mobile vehicle or conveyance or, for that matter on a stationary work surface having, available magnetizable metal component with which one or both magnets can be magnetically but releasably connected.

It can be aptly added and mentioned here that the herein disclosed invention has been actually produced and experimentally used and subjected to every reasonable test and has been found to be highly satisfactory and capable of accomplishing the improved end results desired. Being of the utmost in simplicity of construction it is believed that a more detailed description of the invention is unnecessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination, a portable lunch box, a receiver in which a lower basal portion of said box is telescopingly and detachably mounted and provided with readily applicable and removable clamping and retaining means, and also provided with permanent magnet means arranged and designed to be mounted on a relatively stationary magnetizable surface.

2. In combination, a relatively shallow elongated tray having a receptacle portion, including a bottom and an encompassing marginal rim, said rim having wall portions which can be clampingly bound in position around coacting portions of a lunch box, and at least one permanent magnet, and means for operatively mounting said magnet on one of said wall portions.

3. The structure defined in claim 2 and wherein said means comprises an elongated box-like open bottom sheath in which said magnet is confined and mounted.

4. In combination, a relatively shallow elongated tray-type holder comprising a flat bottom wall provided along opposite longitudinal edges with upstanding spaced parallel opposed side walls constituting components of an encompassing rim, and having transverse end walls, said end walls being of a sectional construction with the sections having adjacent ends spaced apart and said sections being connectible by accompanying snap fasteners, the ends of said bottom wall being spaced inwardly from the transverse walls of said rim, a lunch box having a box-like base portion seated removably in the receptacle portion of said holder, the wall portions of said holder being separably but clampingly connectible with coacting portions of the box, permanent magnets, and means carried by said holder for operatively mounting said permanent magnets.

5. An attachment for a lunch box comprising a bottom wall, an encompassing rim, said rim embodying vertical walls at right angles to the plane of said bottom wall and including a pair of elongated side walls integrated with edge portions of said bottom wall, and transverse end walls, said end walls made up of component sections having adjacent ends spaced apart, readily accessible and openable and closable snap fasteners connected with the sections of said end walls.

6. The structure defined in claim 5 and wherein said side walls are provided with open bottom sheath-like holders, and a permanent magnet mounted in each holder, said holder being open at its bottom to expose a bottom edge portion of the coacting magnet.

References Cited by the Examiner

UNITED STATES PATENTS

| | | | |
|---|---|---|---|
| 2,953,970 | 9/1960 | Maynard | 88—113 |
| 3,067,903 | 12/1962 | Jones | 220—22 |
| 3,186,673 | 6/1965 | Olson | 248—226 |

FOREIGN PATENTS 1,348,460　12/1963　France.

CLAUDE A. LE ROY, *Primary Examiner.*